US008392027B2

(12) United States Patent
Hollaway

(10) Patent No.: US 8,392,027 B2
(45) **Date of Patent: *Mar. 5, 2013**

(54) SPA CONTROL SYSTEM WITH IMPROVED FLOW MONITORING

(75) Inventor: Jerrell P. Hollaway, Melbourne, FL (US)

(73) Assignee: Balboa Instruments, Inc., Tustin, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 12/586,712

(22) Filed: Sep. 28, 2009

(65) Prior Publication Data

US 2011/0072573 A1 Mar. 31, 2011

(51) Int. Cl.
*E04H 4/00* (2006.01)
*G05B 19/18* (2006.01)

(52) U.S. Cl. ........ 700/282; 700/299; 700/300; 700/278; 700/276; 4/111.2; 4/493; 4/492; 4/541.1; 4/545; 219/490; 219/492; 219/493; 219/494; 219/437; 394/465; 236/21; 236/20 R; 361/103

(58) Field of Classification Search .................. 700/282; 4/111.2, 493, 492; 219/490, 492–494, 437
See application file for complete search history.

(56) References Cited

U.S. PATENT DOCUMENTS 4,791,258 A 12/1988 Youtz et al.
5,056,712 A * 10/1991 Enck ........................... 236/20 R
5,245,221 A 9/1993 Schmidt et al.
5,361,215 A 11/1994 Tompkins et al.
5,422,014 A * 6/1995 Allen et al. .................. 210/743
5,545,877 A * 8/1996 Shelton ......................... 219/497
5,550,753 A 8/1996 Tompkins et al.
5,559,720 A 9/1996 Tompkins et al.
5,872,890 A 2/1999 LaCombe
6,104,304 A 8/2000 Clark et al.
6,253,227 B1 6/2001 Tompkins et al.
6,282,370 B1 8/2001 Cline et al.
6,590,188 B2 * 7/2003 Cline et al. .................... 219/497
6,744,223 B2 6/2004 Laflamme et al.
6,756,907 B2 6/2004 Hollaway
6,965,815 B1 11/2005 Tompkins et al.
6,967,448 B2 11/2005 Morgan et al.
6,976,052 B2 12/2005 Tompkins et al.
6,976,636 B2 * 12/2005 Thweatt, Jr. ................ 236/21 B
(Continued)

OTHER PUBLICATIONS

Dictionary.com, “define: turned off”, Jul. 2012, pp. 2.*

(Continued)

*Primary Examiner* — Ramesh B. Patel
*Assistant Examiner* — Olvin Lopez Alvarez
(74) *Attorney, Agent, or Firm* — Larry K. Roberts

(57) ABSTRACT

A spa control system that measures the flow of water through the heater and accurately reports water temperature in the spa using only one solid-state sensor in the heater. The rate of flow is determined by energizing the pump, with the heater still de-energized, and observing the rate in which the moving water cools the inside of the heater. If there is no circulation of water through the heater, the temperature of the sensor will continue to rise from the energy applied when the heater was briefly energized. This rise will be quite significant and a clear indication of a flow problem. If the flow is found to be adequate, the heater will be energized for a normal period of time. The sensor is now carefully monitored for a sudden increase in temperature, which would indicate loss of a normal flow of water.

35 Claims, 5 Drawing Sheets

U.S. PATENT DOCUMENTS

| | | | | |
|---|---|---|---|---|
| 7,202,613 | B2 | 4/2007 | Morgan et al. | |
| 7,327,275 | B2 | 2/2008 | Brochu et al. | |
| 7,440,864 | B2 * | 10/2008 | Otto | 702/119 |
| 7,482,764 | B2 | 1/2009 | Morgan et al. | |
| 2001/0029407 | A1 * | 10/2001 | Tompkins et al. | 700/300 |
| 2002/0069460 | A1 | 6/2002 | Huffington et al. | |
| 2003/0229664 | A1 | 12/2003 | Hollaway | |
| 2005/0177281 | A1 * | 8/2005 | Caves et al. | 700/276 |
| 2006/0162719 | A1 * | 7/2006 | Gougerot et al. | 126/374.1 |
| 2007/0210068 | A1 * | 9/2007 | Reusche et al. | 219/494 |
| 2007/0233509 | A1 * | 10/2007 | Buchman et al. | 705/1 |
| 2008/0168599 | A1 * | 7/2008 | Caudill et al. | 4/541.1 |
| 2009/0132066 | A1 | 5/2009 | Hollaway | |
| 2011/0019983 | A1 * | 1/2011 | Perry et al. | 392/465 |
| 2011/0219530 | A1 * | 9/2011 | Hollaway | 4/493 |

OTHER PUBLICATIONS

D.P. Lerner, Features of the Microprocessor Based Distribution Products Family, Catalina Controls Corporation, Sep. 29, 1986.

* cited by examiner

SPA CONTROL SYSTEM WITH IMPROVED FLOW MONITORING

BACKGROUND OF THE INVENTION

1. Field of the Invention

This invention relates to spa control systems and, more particularity, to methods of monitoring water flow through the heater of a spa.

2. Discussion of Related Art

For several years spa manufactures have been using two or more solid-state sensors to monitor water temperature in the spa as well as temperature somewhere near the heater. One sensor is needed to monitor temperatures at the heater according to the requirements in UL 1563, a standard for electric spas. Another sensor is usually located in the water of the spa to measure the temperature of the spa water.

In conjunction with solid-state sensors, a flow-monitoring device has commonly been used. The spa industry has long used pressure switches in the plumbing as an indication that the circulation pump is running and water is present. This usage of pressure switches has the drawback that certain types of blockage can stop the flow of water but still indicate pressure in the plumbing from the pump.

A better plan has been the usage of flow switches. Many spas being built today employ a flow switch to determine if it is appropriate to activate the heater. Flow switches are somewhat expensive, however, and often unreliable.

U.S. Pat. No. 5,361,215, Tompkins, et al, teaches the use of two temperature sensors to determine water flow thought the heater. One sensor is upstream from the heater while the second sensor is downstream from the heater. A significant difference in temperature between the two sensors is an indication of a flow problem. In all cases, one of the sensors is in the spa water. The other sensor is near the heater. U.S. Pat. No. 6,282,370, Cline, et al, teaches the use of two sensors at separated locations on or within the heater to determine water flow through the heater and also to measure the temperature of the water in the spa. Again, the difference in temperature between the two sensors is used to evaluate the flow of water through the heater.

The Cline approach has several disadvantages. The first problem is that the difference in temperature between the two sensors is very small, even with significant blockage in the plumbing. The Cline approach can be accurate only when the flow is at some minimum level. Another problem is that the spa water temperature is not known when the pump is off. The only solution is to turn on the pump for a short period several times a day in order to measure the water temperature as it passes through the heater and to see if the heater function is needed. Clearly, this approach is not energy friendly.

SUMMARY OF THE INVENTION

The present invention teaches the use of a single temperature sensor in the body of the heater to monitor water flow conditions through the heater and to also measure water temperature in the spa. In a preferred embodiment, a thermistor is placed into a stainless steel closed-end tube and coupled to a microprocessor with wire connections. The tube may be filled with heat conductive epoxy to secure the thermistor in the tube.

The tube is connected to the body of the heater with a compression fitting in a manner that will allow the end of the tube to be close to the heating element inside the heater.

Prior to a flow measurement, the circulation pump is activated for perhaps a minute to bring the temperature inside the heater to approximately the same temperature as the spa water.

As soon as the temperature becomes stable, the pump is turned off and the heater is immediately turned on. After just a brief period of time, the heater is turned back off. Now with both the heater and the pump turned off, the sensor is monitored for heat rise. When a few degrees of heat rise occurs within a short period, say about 30 seconds, it is proven that the sensor is in place and working.

Now, with a working sensor, the circulation pump is turned back on and the sensor is now watched for the effect of the cooling water. If, in a brief period, the sensor returns to a temperature near what it was before the heater was briefly energized, it is proven that flow exists. The heater can now be safely turned on for as long as necessary to bring the spa water up to the desired temperature.

On the other hand, if the flow is inadequate, or there is no water in the heater, the temperature at the sensor will continue to increase for several more degrees.

This proves that there is no flow and the heater, therefore, cannot be turned on for a longer period of time. A flow problem may then be indicated to the user to explain why the heater is not energized. With the pump and heater now running normally, the next task is to watch for a loss of flow of water in the heater. This is accomplished by monitoring the sensor for a high rate of change in temperature whenever the heater is on. An increase of 3-4 degrees Fahrenheit in a period of 30 seconds would be a clear indication that flow, or water, has been lost. If this occurs, the heater will be deactivated immediately and a suitable indication will be provided to the user.

The temperature of the water in the spa will be known by the temperature of the water passing through the heater and over the sensor, as long as the pump is activated. In some cases the pump will not be constantly activated, so the temperature of the spa water is unknown. The Cline patent addresses this problem by turning the pump on several times a day, just to check the water temperature and the possible need for heat.

The present invention solves these problems with artificial intelligence. Each time the pump and heater are activated due to an apparent need for heat, based on the water temperature inside the heater, the pump will run long enough to compare the real water temperature with the previous heater temperature. Any difference will be recorded and applied as an offset to the next activation. New offset errors will recorded with future activations, adapting the process to changes in ambient conditions.

DESCRIPTION OF THE PREFERRED EMBODIMENTS

Figure 1:
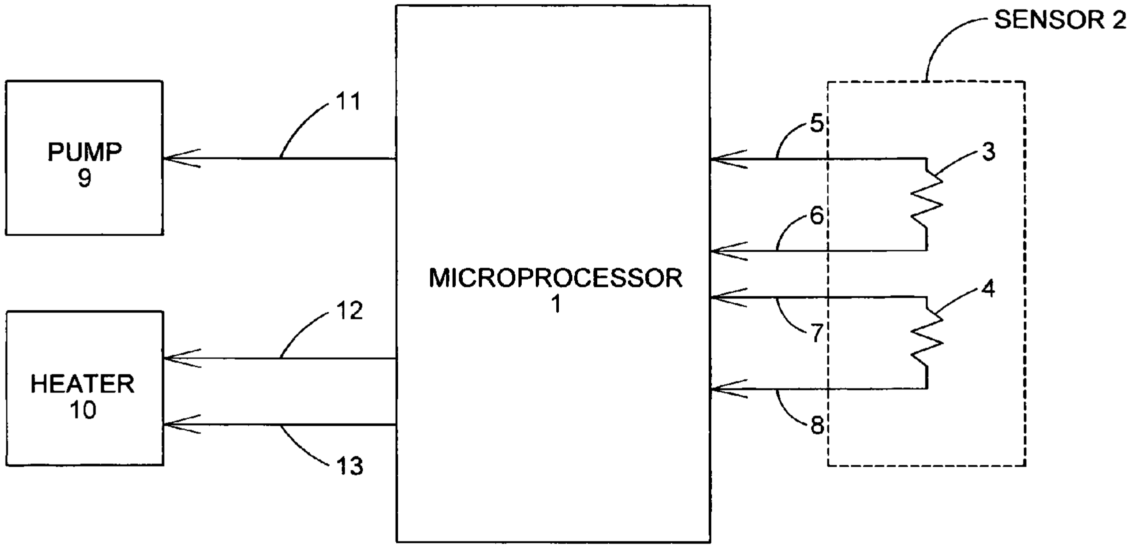
FIG. 1 illustrates a block diagram of the spa control system.
Figure 6:
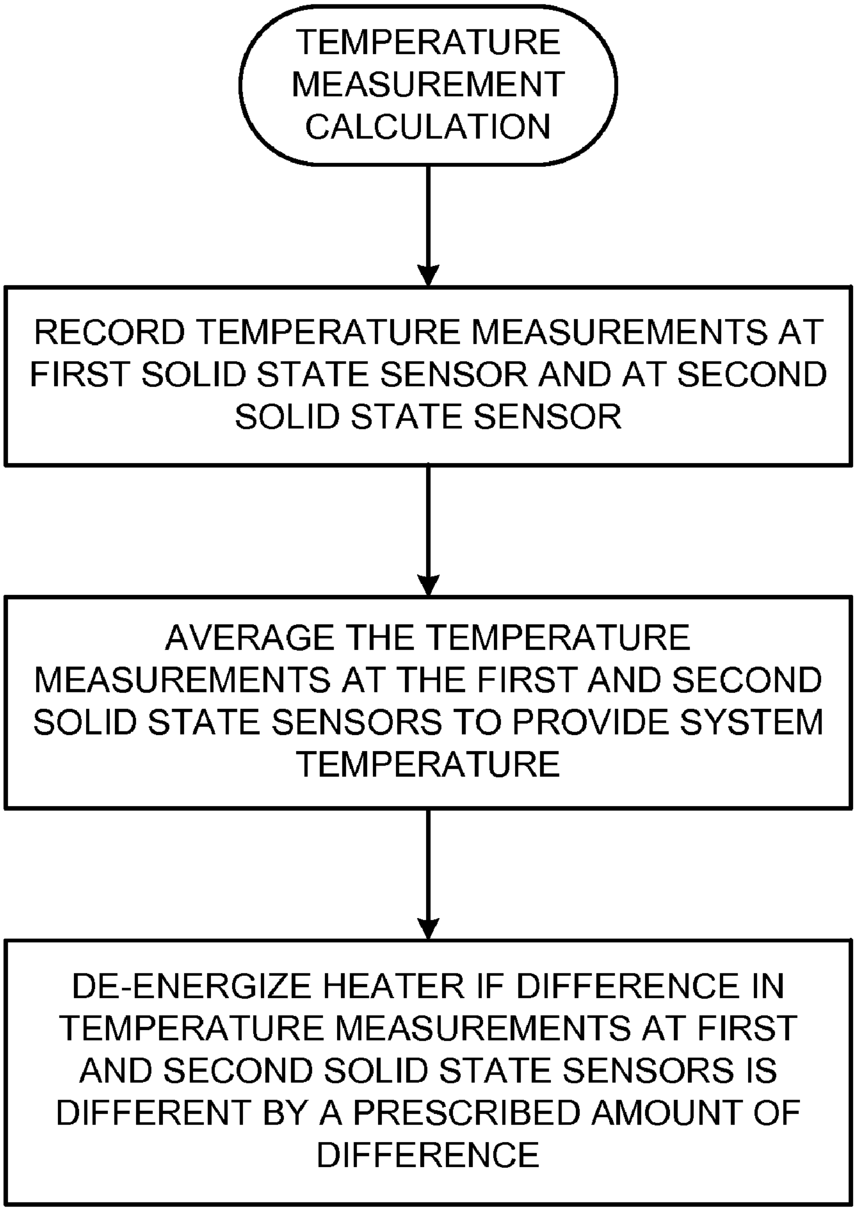

Referring now to FIG. 1, Sensor 2 is made up of Thermistor 3 and Thermistor 4 connected to separate input ports of Microprocessor 1 with wires 5, 6, 7, and 8. Thermistors 3 and 4 may share a common housing means, which is placed near the heating element of a spa heater. Both thermistors are not required for the invention but are included to meet the redundancy requirements of UL 1563 concerning independent circuits to control the heater. The measurements of the two thermistors may be averaged together for the purpose of controlling the water temperature. If the two thermistors report measurements that are different by some prescribed amount, the microprocessor will de-energize the heater and indicate to the user that the sensor is defective. (FIG. 6)

Pump 9 is coupled to microprocessor 1 through circuit means 11, which may include relays, relay drivers, wires, and connectors. Heater 10 is coupled to microprocessor 1 through redundant circuit means 12 and 13.

Figure 3:
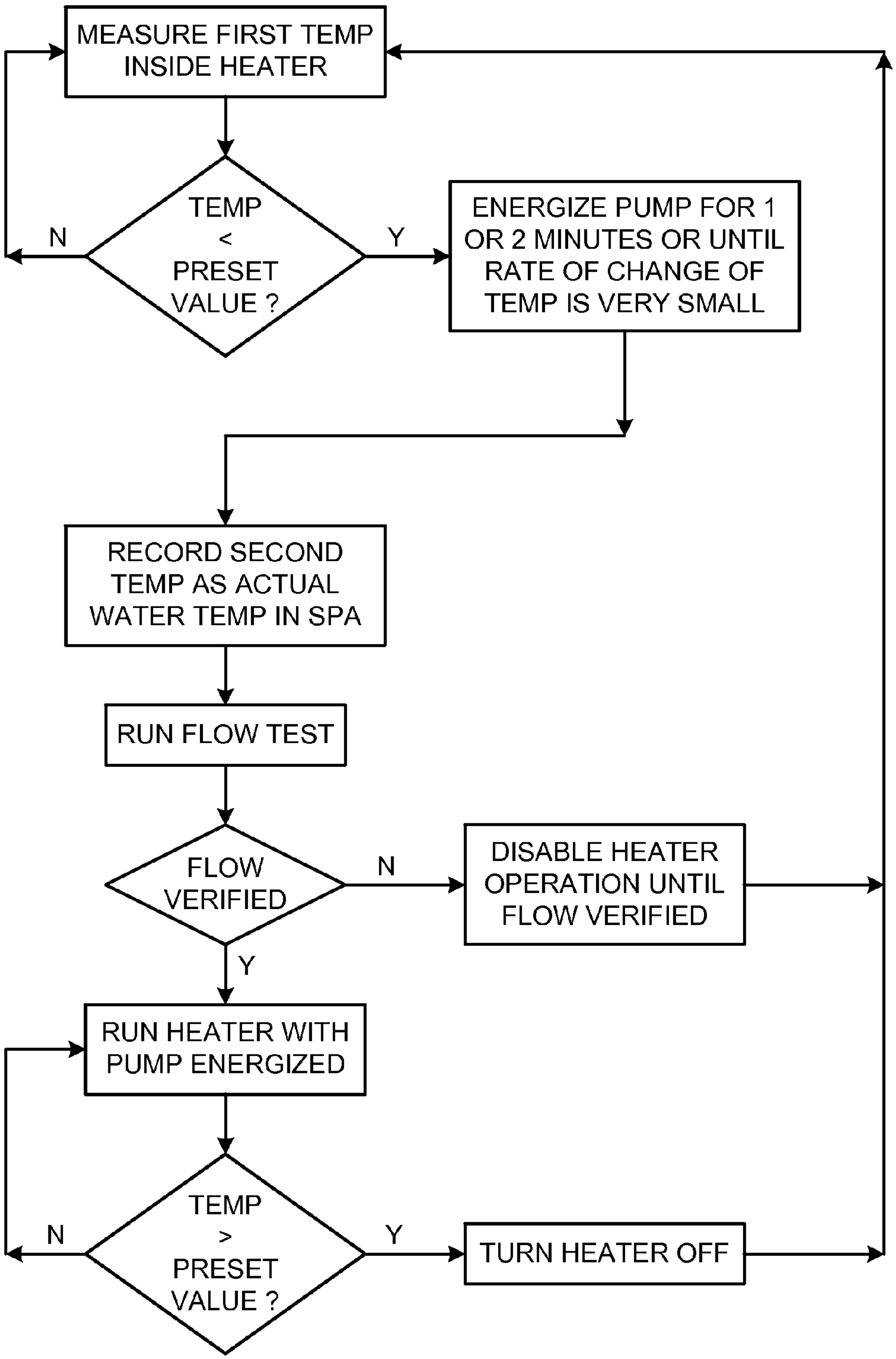
FIGS. 3-6 are flow diagrams illustrating operational features of the spa control system.

In operation, the microprocessor 1 reacts to a first temperature measurement of the sensor 2 when it is less than a preferred temperature for the water and energizes the pump and heater to raise the temperature of said water to the preferred or set temperature. When the temperature measurement of sensor 2 is less than a set temperature maintained by microprocessor 1, microprocessor 1 will cause pump 9 to be energized in preparation for energizing heater 10 when water flow is found to be adequate. (FIG. 3) Pump 9 will circulate water from the vessel containing water for one or two minutes, or until the rate of temperature change, as seen by sensor 2, is very small, within a prescribed rate. A stabilized temperature measurement will be recorded by microprocessor 1 as the actual water temperature in the spa prior to the flow test. Thus, the pump is energized for a period of time before the heater is energized so that a second temperature measurement can be made which is more indicative of the temperature of water in the vessel.

When the temperature measurement of sensor 2 is less than a set temperature maintained by microprocessor 1, microprocessor 1 will cause pump 9 to be energized in preparation for energizing heater 10 when water flow is found to be adequate. Pump 9 will circulate water from the vessel containing water for one or two minutes, or until the rate of temperature change, as seen by sensor 2, is very small. A stabilized temperature measurement will be recorded by microprocessor 1 as the actual water temperature in the spa prior to the flow test.

Figure 4:
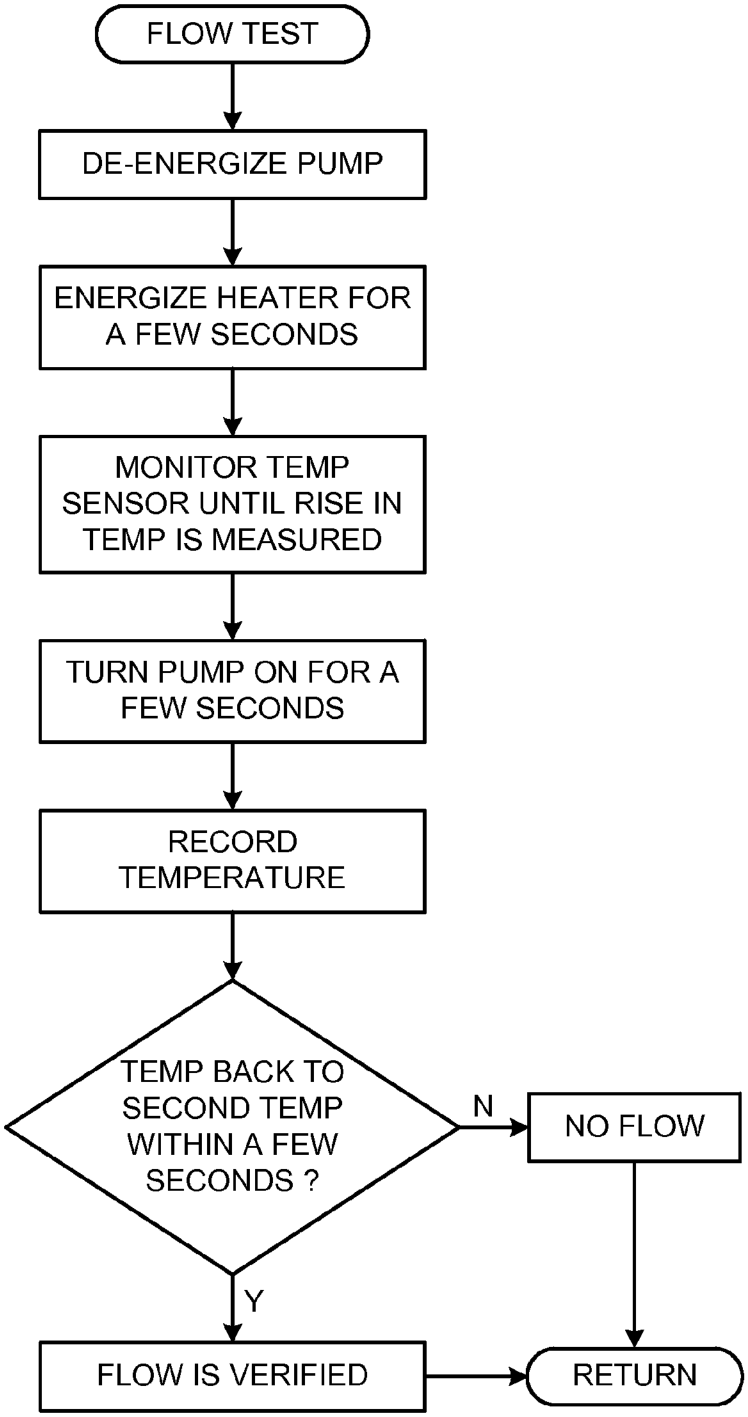

The first step in the flow test (FIG. 4) is to turn off, or de-energize, circulation pump 9. The next step is to turn on heater 10, but only for a few seconds. After heater 10 is turned back off, sensor 2 is monitored for a rise in temperature. With no circulation in heater 10, a rise of several degrees is expected within, say 30 seconds. As soon as the desired rise is seen (perhaps 10 degrees), pump 9 is turned back on so that the cooling water can dissipate the recent heat rise within a few seconds. If the flow is good, the temperature at sensor 2 will be back to near the water temperature recorded prior to the brief heater activation. Finally, now that flow has been verified, heater 10 can be turned on a longer period to heat the water to, or beyond, the set temperature.

If, however, the temperature continued to rise after pump 9 was turned on, a flow problem exists and heater 10 must be left off until the problem is resolved. A signal, such as a flashing LED, or a change of color somewhere on a user interface, can be provided to the user to explain why heating is not taking place.

Figure 5:
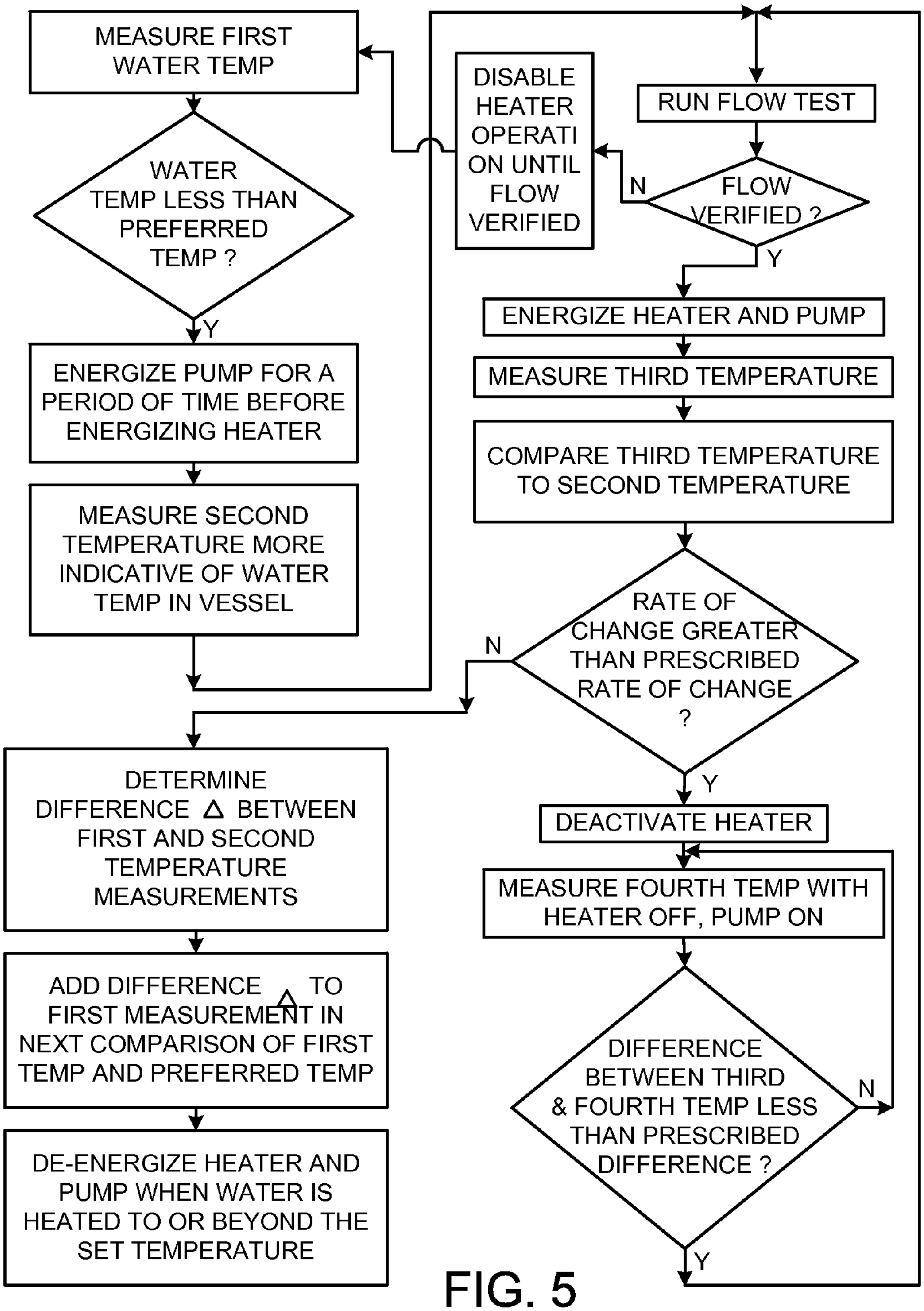

Flow problems can later occur due to blockage or water loss. Sensor 2 must be carefully monitored for a rapid increase in temperature inside the heater, or for an increase in temperature over a longer period of time that is unreasonable and indicative of a dirty filter, for example. Comparing the rise in temperature with the time required to reach that temperature does this. If the rate of change is greater than a prescribed rate, poor flow may be causing the heater to become hotter than the water in the vessel. Heater 10 must be de-energized immediately and another flow test attempted. A third temperature measurement can be made, after the Pump and heater are both energized, and compared to the second temperature measurement so that a rate of change greater than a prescribed rate of change will cause the microprocessor to de-energize the heater. A fourth temperature measurement can be made, while heater is de-energized and Pump is still energized, and compared to the third temperature measurement so that the heater can be energized again if the difference between these measurements is less than a prescribed difference. (FIG. 5)

As a further improvement over the prior art, a method for preventing short heating cycles is taught in the present invention. With pump 9 not running and only one sensor in the system, the water temperature in the vessel may be different than the water temperature in heater 10, due to the differences in volume and location. If sensor 2 measures a temperature lower than the set temperature, microprocessor 1 will normally turn on pump 9 and heater 10 to reach the set temperature. If the spa water was not as cold as the heater 10 temperature, which caused pump 9 to be turned on, pump 9 will quickly turn back off as soon as the real water temperature is seen by sensor 2.

This problem can be solved through the use of artificial intelligence. Microprocessor 1 can keep a record of the differences between the apparent water temperature in heater 10 and the real water temperature as will be discovered when pump 9 is turned on and run for a minute or two. This difference can now be applied as an offset to the next heater 10 temperature measurement. Thus, any difference between a first measurement of the apparent water temperature and a second measurement of the real water temperature is added to the first measurement in the next comparison of the first measurement and the preferred temperature. For example, if the set temperature is 100 degrees, pump 9 will be turned on at perhaps, 99 degrees. Once pump 9 has circulated the spa water through heater 10 it may be seen that it was unnecessary to turn on pump 9 with only one degree of difference, so one degree of offset will be added to the heater temperature before pump 9 is turned on again at 98 degrees. This process will continue until the heater temperature with the offset added closely matches the actual spa water temperature when the pump is first activated in preparation of a heating cycle.

An additional improvement may be made after observing the rate of change in the heater temperature while the pump is off. In the previous example, the offset may be adjusted to a larger number, perhaps five degrees, if the heater is found to be cooling very quickly. This would provide a closer match between the water in the vessel and the user preferred temperature at the time the pump and heater are turned on.

Figure 2:
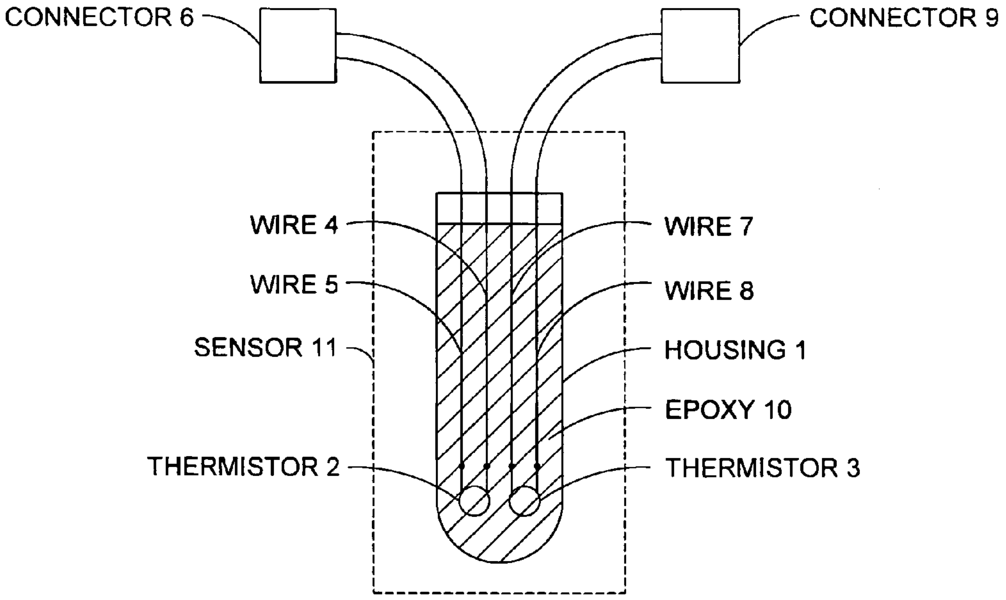
FIG. 2 illustrates a temperature sensor with redundant thermistors.

FIG. 2 illustrates a possible construction of sensor 11. Two solid-state sensor elements are represented by thermistor 2 and thermistor 3. Devices other than thermistors, such as PN junctions, are also well known for this type of application. Only thermistor 2 or thermistor 3 is required for the invention to operate as described. UL standard 1563 for electric spas, however, requires totally redundant circuitry to control each power line of a spa heater, so it is convenient to place two thermistors at the same location in the heater.

Housing 1 of sensor 11 may be a closed end stainless steel tube of a size that fits into the heater using a standard compression fitting. Thermistor 2 is attached to connector 6 with wires suitable for the purpose. Thermistor 3 is attached to connector 9 with wires 7 and 8.

After thermistors 2 and 3 are placed in housing 1, housing 1 may be filled with a heat conductive epoxy or similar material, as long as the material is not electrically conductive.

Connectors 6 and 9 provide electrical coupling to a microprocessor through circuitry means.

Others skilled in the art of spa control design may make changes to what is taught within this invention without departing from the spirit of the invention.

What is claimed is:

1. A spa control system comprising:

a vessel for holding water;

a heater for heating said water, the heater including a heating element;

a pump for circulating said water through said heater;

a solid-state temperature sensor positioned near the heating element of said heater for sensing temperature at a single location in a water flow path of the spa;

a microprocessor coupled to said heater, said pump, and said sensor for the purpose of controlling said heater and said pump based on the temperature measurements of said sensor, said microprocessor configured to control said heater to operate while the pump is de-energized, to control the pump to operate with the heater de-energized, and to control the pump to operate with the heater energized.

2. The system in claim 1, wherein said microprocessor records a first temperature measurement at said sensor while said pump and said heater are de-energized but after said heater has been recently energized with the pump de-energized, and records a second temperature measurement after said pump has been energized for a period of time, with said microprocessor controlling said heater according to a difference between first measurement and said second measurement.

3. The system in claim 2, wherein a rate of change between said first measurement and said second measurement is calculated by said microprocessor and used to determine an amount of water flow through said heater.

4. The system of claim 2, wherein said pump circulates said water through said heater prior to said first temperature measurement.

5. The system of claim 4, wherein said pump circulates said water for a prescribed period of time prior to said first temperature measurement.

6. The system of claim 4, wherein said pump circulates said water until a rate of change of said water temperature at said sensor is within a prescribed rate.

7. The system in claim 1, wherein a second solid-state sensor is placed adjacent to said solid-state sensor to provide redundancy for the sensor function.

8. The system in claim 7, wherein said sensors share a common sensor housing means at said single location.

9. The system in claim 7, wherein measurements of said first and second sensors are averaged together by said microprocessor.

10. The system of claim 7, wherein measurements of said sensors are compared by said microprocessor so that whenever said measurements are different by a prescribed amount of difference said microprocessor de-energizes said heater.

11. The system in claim 1, wherein said microprocessor reacts to a first temperature measurement of said sensor when it is less than a preferred temperature for said water to conduct a water flow test and to energize said pump and said heater to raise the temperature of said water to said preferred temperature if the flow test verifies water flow.

12. The system in claim 11, wherein said pump is energized for a period of time before said heater is energized so that a second temperature measurement can be made which is more indicative of the temperature of water in the vessel.

13. The system in claim 12, wherein any difference between said first measurement and said second measurement is added to said first measurement in the next comparison of said first measurement and said preferred temperature.

14. The system in claim 12, wherein a third temperature measurement is made, after said pump and said heater are both energized, and compared to said second temperature measurement so that a rate of change greater than a prescribed rate of change will cause said microprocessor to de-energize said heater.

15. The system in claim 14, wherein a fourth temperature measurement is made, while heater is de-energized and pump is still energized, and compared to said third temperature measurement so that said heater will be energized again if the difference between said measurements is less than a prescribed difference.

16. The system of claim 1, wherein the temperature sensor for sensing temperature at said single location is mounted to a housing body of the heater and is exclusive to any other temperature sensor to calculate water flow conditions and to measure water temperature in the spa.

17. A spa control system for controlling operation of a spa including a vessel for holding water, a heater for heating the water and including a heater element, and a pump for circulating said water through the heater, the control system comprising:

a solid-state temperature sensor positioned near the heating element of the heater for sensing temperature at a single location in a water flow path of the spa; and a microprocessor coupled to the heater, the pump, and said sensor for controlling the heater and the pump based on temperature measurements of said sensor at the single location, said microprocessor configured to control the heater to operate while the pump is de-energized, to control the pump to operate with the heater de-energized, and to control the pump to operate with the heater energized.

18. The system of claim 17, wherein said microprocessor records a first temperature measurement at said sensor while said pump and said heater are de-energized but after said heater has been recently energized with the pump de-energized, and records a second temperature measurement after said pump has been energized for a period of time, with said microprocessor controlling said heater according to a difference between first measurement and said second measurement.

19. The system of claim 18, wherein a rate of change between said first measurement and said second measurement is calculated by said microprocessor and used to determine an amount of water flow through said heater.

20. The system of claim 18, wherein said pump circulates said water through said heater prior to said first temperature measurement.

21. The system of claim 20, wherein said pump circulates said water for a prescribed period of time prior to said first temperature measurement.

22. The system of claim 20, wherein said pump circulates said water until a rate of change of said water temperature at said sensor is within a prescribed rate.

23. The system in claim 18, wherein any difference between said first measurement and said second measurement is added to said first measurement in the next comparison of said first measurement and said preferred temperature.

24. The system in claim 18, wherein a third temperature measurement is made, after said pump and said heater are both energized, and compared to said second temperature measurement so that a rate of change greater than a prescribed rate of change will cause said microprocessor to de-energize said heater.

25. The system of claim 17, wherein a second solid-state sensor is placed adjacent to said solid-state sensor to provide redundancy for the sensor function.

26. The system of claim 25, wherein said sensors share a common sensor housing means at said single location.

27. The system of claim 25, wherein measurements of said first and second sensors are averaged together by said microprocessor.

28. The system of claim 25, wherein measurements of said first and second sensors are compared by said microprocessor so that whenever said measurements are different by a prescribed amount of difference said microprocessor de-energizes said heater.

29. The system in claim 25, wherein a fourth temperature measurement is made, while heater is de-energized and pump is still energized, and compared to said third temperature measurement so that said heater will be energized again if the difference between said measurements is less than a prescribed difference.

30. The system in claim 17, wherein said microprocessor reacts to a first temperature measurement of said sensor when it is less than a preferred temperature for said water to conduct a water flow test and to energize said pump and said heater to raise the temperature of said water to said preferred temperature if the flow test verifies water flow.

31. The system of claim 30, wherein said pump is energized for a period of time before said heater is energized so that a second temperature measurement can be made which is more indicative of the temperature of water in the vessel.

32. The system of claim 17, wherein the temperature sensor for sensing temperature at said single location is mounted to a housing body of the heater and is exclusive to any other temperature sensor to calculate water flow conditions and to measure water temperature in the spa.

33. A spa control system for measuring a flow of water through the spa heater and accurately reporting water temperature in the spa vessel, by selective operation of the spa circulation pump and the spa heater and temperature measurements at a single location, the spa control system comprising:

a solid-state sensor for sensing temperatures at a single location in the spa heater;

a microprocessor connected to the solid-state sensor for receiving signals indicated of temperatures sensed by the solid-state sensor, the microprocessor further connected to the pump and the heater for selectively energizing and de-energizing the pump and the heater, said microprocessor configured to control the heater to operate while the pump is turned off, to control the pump to operate with the heater turned off, and to control the pump to operate with the heater turned on;

the microprocessor configured for determining whether the solid-state sensor is in working condition by activating the heater for a brief period of time, with the circulation pump de-energized, and monitoring for an expected heat rise at the sensor;

the microprocessor further configured to conduct a flow test in the event the sensor is determined to be in working condition, by energizing the pump with the heater de-energized, and observing a rate in which moving water cools an inside of the heater, and declaring a flow problem if a temperature sensed by the sensor continues to rise from energy applied when the heater was briefly energized during the sensor test;

the microprocessor further configured, in the event the flow test indicates adequate water flow, to energize the heater and pump in normal operation to hold the water temperate at a set temperature, and to monitor the sensor for a sudden increase in temperature, indicating loss of a normal flow of water.

34. The spa control system of claim 33, wherein the microprocessor is further configured to keep a record of the difference between the temperature value sensed by the temperature sensor with the pump and heater de-energized as a heater temperature measurement, and with the pump energized with the heater de-energized to measure the water temperature after the pump has been energized after a given time interval and to obtain the temperature indicated by the sensor to provide an accurate temperature of water in the spa vessel, as a learned temperature difference, and to apply the learned temperature difference to a subsequent heater temperature measurement as an offset.

35. The system of claim 33, wherein the temperature sensor for sensing temperature at said single location is mounted to a housing body of the spa heater and is exclusive to any other temperature sensor to calculate water flow conditions and to measure water temperature in the spa.

* * * * *